(12) United States Patent
Evans et al.

(10) Patent No.: US 9,501,490 B2
(45) Date of Patent: Nov. 22, 2016

(54) AUTOMATIC SYNCHRONIZATION OF MOST RECENTLY USED DOCUMENT LISTS

(75) Inventors: Elizabeth Evans, Seattle, WA (US); Amanda Font, Kirkland, WA (US); Shilpa Makineni, Redmond, WA (US); Evan Kutter, Seattle, WA (US); Chung Webster, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 13/163,742

(22) Filed: Jun. 20, 2011

(65) Prior Publication Data

US 2012/0323935 A1    Dec. 20, 2012

(51) Int. Cl.
*G06F 17/30*     (2006.01)
*G06F 15/16*     (2006.01)

(52) U.S. Cl.
CPC ... *G06F 17/30174* (2013.01); *G06F 17/30203* (2013.01)

(58) Field of Classification Search
USPC .................................................. 707/752, 751
See application file for complete search history.

(56) References Cited

U.S. PATENT DOCUMENTS

| | | | |
|---|---|---|---|
| 5,897,643 A | 4/1999 | Matsumoto | |
| 7,395,267 B2 | 7/2008 | Hilbert et al. | |
| 2005/0165935 A1 | 7/2005 | Moody et al. | |
| 2005/0177580 A1 | 8/2005 | Hilbert et al. | |
| 2005/0246331 A1* | 11/2005 | De Vorchik et al. | 707/3 |
| 2005/0278280 A1* | 12/2005 | Semerdzhiev et al. | 707/1 |
| 2006/0112150 A1 | 5/2006 | Brown et al. | |
| 2006/0218503 A1* | 9/2006 | Matthews et al. | 715/779 |
| 2008/0005685 A1 | 1/2008 | Drews et al. | |
| 2009/0144283 A1 | 6/2009 | Clark et al. | |
| 2009/0228470 A1* | 9/2009 | Zawacki et al. | 707/5 |
| 2010/0017362 A1 | 1/2010 | Srinivasan | |
| 2010/0088316 A1 | 4/2010 | Robinson et al. | |

FOREIGN PATENT DOCUMENTS

CN    101147115 A    3/2008
WO    2010081742 A1    7/2010

OTHER PUBLICATIONS

Rowlingson, Paul, "Recent Documents 2.0", Retrieved at <<http://www.v3.co.uk/v3-uk/download-review/1957012/recent-documents>>, Aug. 5, 2004, pp. 10.

(Continued)

*Primary Examiner* — Alex Gofman
(74) *Attorney, Agent, or Firm* — Julia F. Akhter; Alpana Tiwari; Micky Minhas (57) ABSTRACT

A most recently used (MRU) client synchronization engine is provided to synchronize a user's most recently used (MRU) document list associated with a client machine with a file hosting server's MRU document list. The file hosting server's MRU document list contains a list of the user's most recently used documents that are stored on the file hosting server. The user's documents that are stored on the file hosting server are accessible to the user on one or more web-enabled client machines. The MRU client synchronization engine analyzes registry data pertaining to the documents that a user uses on the client machine with the file hosting server's MRU document list to determine the user's most recently used documents.

20 Claims, 10 Drawing Sheets

(56) References Cited

OTHER PUBLICATIONS

"Office 2010 and the Cloud", Retrieved at <<http://mymicrosoftlife.com/2009/11/21/office-2010-and-the-cloud/>>, Nov. 21, 2009, pp. 4.

"Document List View", Retrieved at <<http://www.isilo.com/support/manual/iSiloIP/DocumentListView.htm>>, Retrieved Date: Mar. 28, 2011, pp. 9.

"International Search Report", Mailed Date: Jan. 10, 2013, Application No. PCT/US2012/042108, Filed Date: Jun. 13, 2012, pp. 12.

"Supplementary Search Report Received for European Patent Application No. 12803222.4", Mailed Date: May 4, 2015, 6 Pages.

Zhu, et al., "Temporal Analysis of Windows MRU Registry Keys", In Advances in Digital Forensics, Chapter 6, Jan. 30, 2009, pp. 83-93.

"First Office Action and Search Report Issued in Chinese Patent Application No. 201280030495.1", Mailed Date: Jul. 15, 2015, 18 Pages.

"Second Office Action and Search Report Received for China Patent Application No. 201280030495.1", Mailed Date: Feb. 6, 2016, 23 Pages.

"Office Action Issued in Japanese Patent Application No. 2014-517017", Mailed Date: Apr. 19, 2016, 6 Pages.

"Office Action Issued in Chinese Application No. 201280030495.1", Mailed Date: Jul. 15, 2016, 13 Pages.

* cited by examiner

| ITEM NUMBER 402 | ENTRY TYPE 404 | PIN STATE 406 | LAST MODIFIED TIMESTAMP 408 | FLAGS 410 | ADDRESS 412 |
|---|---|---|---|---|---|

FIG. 5

| DAV ADDRESS 502 | LAST MODIFIED TIMESTAMP 504 | PIN STATE 506 | PIN TIMESTAMP 508 | DELETE FLAG 510 | DELETE TIMESTAMP 512 |
|---|---|---|---|---|---|

AUTOMATIC SYNCHRONIZATION OF MOST RECENTLY USED DOCUMENT LISTS

BACKGROUND

A most recently used (MRU) document list contains links to documents that a user has recently opened or saved. The MRU document list is a convenient mechanism for accessing a document that was recently used. By storing the links in the MRU document list, a user does not have to navigate to a document's location to open it. A user may click on the link in the MRU document list and quickly access a document without knowing the document's location.

A user's documents may be stored remotely on a file hosting server that is accessible through a web browser. The user may access the documents stored on the file hosting server through a web-enabled computing device. Each computing device has a MRU document list containing documents the user used recently from the file hosting server, as well as other locations, while logged onto the computing device. However, the MRU document list in the computing device may not accurately reflect the most recently used documents stored on the file hosting server that the user may have used from another computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user may store documents in a web-accessible file hosting server and access the documents using any web-accessible client machine. The file hosting server contains a MRU-server document list, for each user, that lists the user's most recently used documents that are stored on the file hosting server. A client machine contains a MRU-client document list that includes the user's most recently used documents stored on the file hosting server and/or the client machine. Each client machine may not be aware of accesses the user has made to the user's documents stored on the file hosting server from other client machines. As such, the MRU document list on a particular client machine may not accurately reflect the user's most recently used documents. In order to maintain an unified view of a user's most recently used documents across multiple web-accessible computing devices, a MRU synchronization engine is provided to synchronize the MRU document lists.

In an embodiment, the MRU synchronization engine obtains a configuration list from a file hosting server and compares it with document entries stored in the client machine's registry. The configuration list contains configuration data pertaining to the user's most recently used documents that are stored on the file hosting server. The registry is a database on the client machine that stores data pertaining to documents used by the user from the client machine. The MRU synchronization engine analyzes the information in both the configuration list and the registry list to determine which documents have been more recently used. In addition, the MRU synchronization engine notifies the file hosting server of updates needed to the keep the MRU-server document list current.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a technology for automatically synchronizing multiple MRU document lists that reference a common set of documents. A MRU document list is a list of documents that a user has more recently used. A user may store documents in a web-accessible file hosting server that the user may access from any web-enabled client machine. The file hosting server and the web-enabled computing device each contain a MRU document list listing the user's documents stored on the file hosting server that the user has used most recently. A user may use several client machines to access the user's documents from the file hosting server. Each client machine may not be aware of the user's access to these documents from other client machines. As such, the MRU document list on a particular client machine may not accurately reflect the user's most recently used documents. In order to maintain a unified view of the most recently used documents stored on the file hosting server across multiple web-enabled client machines, a mechanism is provided to synchronize the user's MRU document lists across these devices.

A MRU synchronization engine may be utilized in a client machine to synchronize a MRU-client document list with a MRU-server document list. The MRU-client document list contains links to the most recently used documents that were used by the user from the client machine. The MRU-server document list contains links to the user's most recently used documents that are stored in the file hosting server which were accessed through any client machine.

The MRU synchronization engine obtains a configuration list from the file hosting server and compares it with the client machine's registry list. A configuration list contains configuration data pertaining to each document in the MRU-server document list. A registry list contains configuration data pertaining to each document used by the user on the client machine. The MRU synchronization engine analyzes the information in both files to determine which documents are the user's most recently used documents. In addition, the MRU synchronization engine notifies the file hosting server of updates needed to the MRU-server document list that may be attributable to the user's use from the client machine. Attention now turns to a more detailed description of the technology for performing this synchronization.

Figure 1:
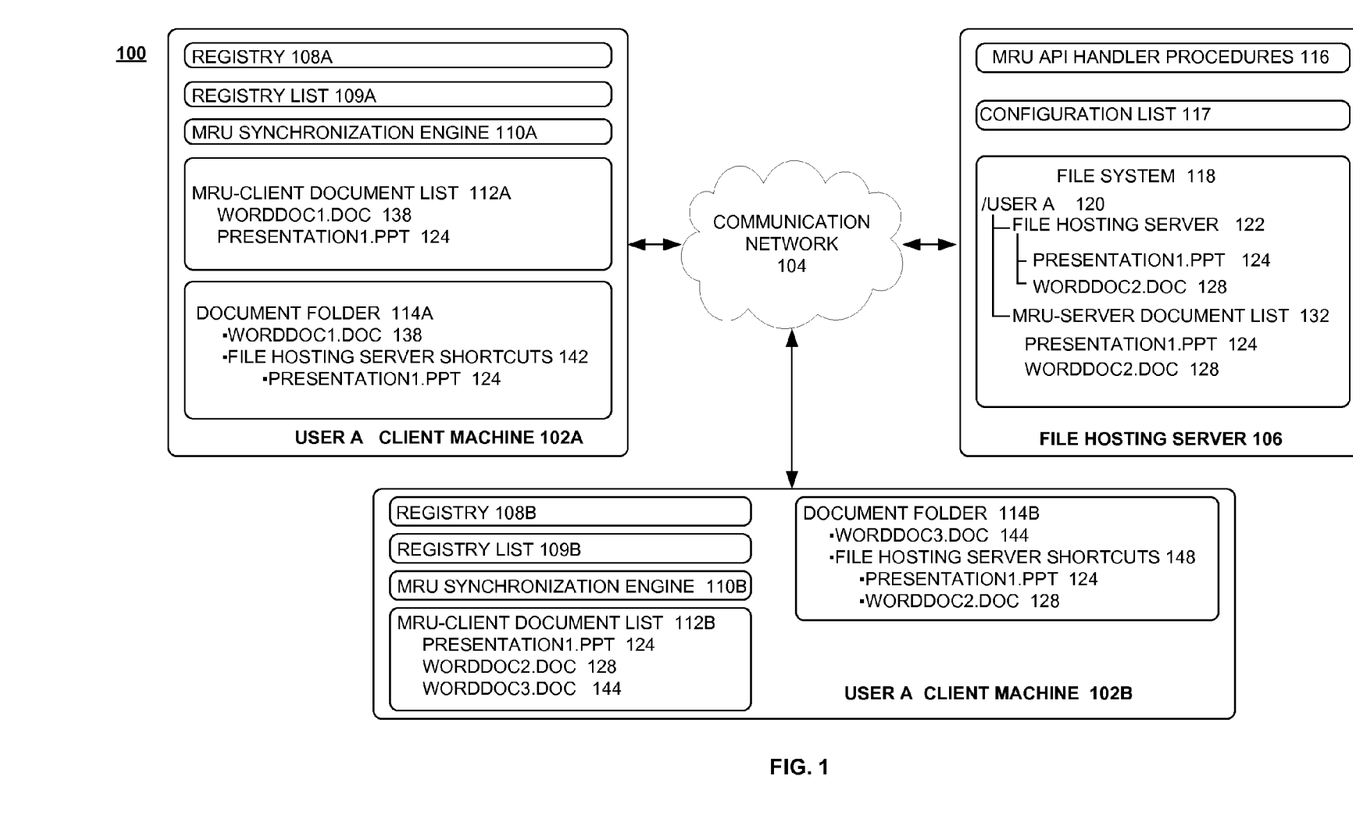
FIG. 1 illustrates an exemplary system for automatically synchronizing a MRU-client document list with a MRU-server document list.

FIG. 1 illustrates an exemplary system 100 for automatically synchronizing MRU document lists. The system 100 includes one or more client machines 102a, 102b (collectively referred to as 102) coupled via a communication network 104 to a file hosting server 106. A client machine 102 may be any type of computing device, such as a personal computer, a server, a notebook computer, a laptop computer, a desktop computer, a personal digital assistant, a smart phone, a cellular telephone, a pager, a messaging device, a tablet computer, a handheld computer and the like.

A file hosting server 106 may be any type of web-accessible file storage system, such as a server, a web server, a network server, a storage server, a file sharing server, and the like. Examples of file hosting servers 106 are Windows Live Sky Drive, Google Docs, Box.net, and the like. The communication network 104 facilitates communications between the client machines 102 and the file hosting server 106. The communication network 104 may embody any type of communications medium, such as wired or wireless networks, utilizing any communication protocol.

Each client machine 102 may contain a registry 108, a registry list 109, a MRU synchronization engine 110, a MRU-client document list 112, and a document folder 114. A file hosting server 106 may contain MRU application programming interface (API) handler procedures 116, a configuration list 117, and a file system 118. The file system 118 may contain a folder for each user 120 containing the user's documents that are stored in the file hosting server and a MRU-server document list 132 containing links to the user's most recently used documents.

Each client machine 102 may contain a registry 108 that is a central repository for storing configuration data and settings used by an operating system. In some embodiments, the registry 108 may be configured as a hierarchical folder-like structure of files where each subset of files is referred to as a registry hive. Each registry hive is associated with a registry key which is similar to a folder in a file system.

Each time a file is accessed or reconfigured, an entry is placed in the registry key that is associated with the document type. For example, the registry key "HKEY_CURRENT_USER\Software\Microsoft\Office\12.0\Word\File MRU" stores entries pertaining to word documents, the registry key "HKEY_CURRENT_USER\Software\Microsoft\Office\12.0\PowerPoint\File MRU" stores entries pertaining to power point files, and the registry key "HKEY_CURRENT_USER\Software\Microsoft\Office\12.0\Excel\File MRU" stores entries pertaining to excel files.

It should be noted that although the term "registry" is commonly used in the context of a Windows®-based operating system, the technology disclosed herein is not constrained to any particular operating system or registry configuration. Other techniques that provide a similar functionality can be employed as well, such as, without limitation, the configuration files used in Linux or Unix-based operating systems, and the like.

A registry list 109 contains configuration data pertaining to all documents that a user uses or accesses from the client machine 102. The registry list 109 may contain entries for documents that are stored on the client machine, the file hosting server, and other remote storage locations.

A MRU synchronization engine 110 may be an application that synchronizes a particular MRU-client document list with a MRU-server document list. A MRU synchronization engine 110 may be embodied in software and implemented as a software component, program, computer program, application program, system program, machine program, operating system software, middleware, firmware, software module, routine, subroutine, function, method, procedure, software interface, instruction set, computing code, code segment, process, thread, and any combination thereof. Alternatively, the MRU synchronization engine 110 may be part of another application and implemented as a separate executing thread or process. The embodiments are not constrained to any particular type of software implementation for the MRU synchronization engine.

A MRU-client document list 112 is a listing of the most recently used documents that a user has most recently used. The name of each document in the MRU-client document list is a shortcut to the location of the document's file. The MRU-client document list 112 may list documents stored locally on a client machine 102 and documents stored on the file hosting server 106. In one or more embodiments, a document may be a word document, a power point document, and/or an excel document. Each document is configured as a file and the terms "document" and "file" are used interchangeably herein. The MRU-client document list 112 may be referred to in certain operating systems as the "Recently Used" folder, the "My Recent Documents" folder, the "Recent Items" folder, and the like.

The MRU-client document list 112 may be maintained by an application that tracks the documents that the user uses. The application may add documents to a MRU-client document list based on a timestamp indicating the time a user last accessed a document. A user's access may consist of opening a document or saving a document. The application may track MRU changes in order to reconfigure the status of the document (e.g., deleted, pinned). A user may elect to keep a document on the MRU-client document list even though the document has not been accessed recently by "pinning" the document. By "pinning" a document, the user indicates its preference to keep the document on the MRU-client document list irrespective of its use. A user may "unpin" a document that was once pinned thereby allowing the time of its access to determine its placement on the MRU-client document list. A user may also elect to "delete" a document from the MRU-client document list although the document remains accessible. Subsequent accesses to a deleted document may place the document back onto the MRU-client document list.

The documents listed in a MRU-client document list 112 are represented by links to the actual location of the document. The links are used to access a document quickly without opening the document from its actual location.

A document folder 114 lists the documents stored locally on the client machine 102 as well as the user's documents that are stored in the file hosting server 106, in a separate shortcuts folder 142. Although the document folder in FIG. 1 shows the name of each document, the document name is actually a link to a location of the document which is otherwise referred to as a shortcut.

As shown in client machine 102A, user A has a document folder 114A containing the documents, worddoc1.doc 138 which is stored locally on client machine 102A. The document folder 114A contains a subfolder, file hosting server shortcuts 142, containing links to the user's document, presentation1.ppt 124, stored on file hosting server 106. The MRU-client document list 112A for user A on client machine 102A includes worddoc1.doc 138 and presentation1.ppt 124.

As shown in client machine 102B, user A has a document folder 114B containing the document, worddoc3.doc 144, which is stored locally on client machine 102B. The document folder 114B contains a subfolder, file hosting server shortcuts 148, containing links to the user's documents, presentation1.ppt 124 and worddoc2.doc 128, which are stored on the file hosting server 106. The MRU-client document list 112B for user A on client machine 102B includes presentation1.ppt 124, worddoc2.doc 128 and worddoc3.doc 144.

The file hosting server 106 contains one or more MRU application programming interface (API) handler procedures 116, a configuration list 117, and a file system 118. The MRU synchronization engine 110 interacts with the file hosting server 106 through one or more APIs. An API may be implemented as a remote procedure call. A remote procedure call is a form of messaging where a sender appears to be executing or calling a local procedure with specified parameters. The handler of the remote procedure call runs in a separate address space. The MRU synchronization engine 110 uses one or more APIs to notify the file hosting server 106 of updates needed to the MRU-server document list 132. The MRU API handler procedures 116 receive the specified parameters used in an API procedure call from the MRU synchronization engine 110 and process them accordingly. The MRU API hander procedures 116 are located in the file hosting server 106.

The configuration list 117 is a file containing an entry for each document listed in the MRU-server document list 132. Each entry contains configuration data pertaining to the configuration of the document including usage of the document on all client machines 102.

The file system 118 on the file hosting server 106 may contain a file folder for each user. As shown in FIG. 1, the file hosting server 106 has a file folder for user A 120 that contains a subfolder 122 storing the user's documents and a MRU-server document list 132. The MRU-server document list 132 is a folder listing the user's most recently used documents from the documents stored on the file hosting server 106. The MRU-server document list 132 includes presentation1.ppt 124 and worddoc2.doc 128. The user may elect to keep a document on the MRU-server document list 132 in the same manner discussed above with respect to the MRU-client document list. That is, the user may "pin", "unpin", and "delete" a document from the MRU-server document list 132 in the same manner discussed above.

As shown in FIG. 1, the subfolder named File Hosting Server 122 stores user A's documents presentation1.ppt 124 and worddoc2.doc 128. By storing these documents 124, 128 on the file hosting server 106, user A may access these documents from a web interface separate from the client machines. User A may use the MRU-client document list on client machine 102A to open the file presentation1.ppt 124 which is stored on the file hosting server 106. By accessing presentation1.ppt 124 through the MRU-client document list 112A on client machine A, user A can avoid accessing presentation1.ppt 124 through a web browser. Likewise, user A may use the MRU-client document list 112B on client machine 102B to open the documents presentation1.ppt and worddoc2.doc, each of which is stored on the file hosting server 106.

The user's MRU-server document list 132 should reflect the user's most recently used documents for those documents stored on the file hosting server 106. A MRU-client document list 112 may not reflect the most recent uses of those documents especially when the documents were used by the user on another client machine. For this reason, each client machine 102 synchronizes the MRU-server document list 132 with the user's MRU-client document list 112 associated with a particular client machine 102.

For example, as shown in FIG. 1, the MRU-client document list 112A shows that user A's most recently used documents on client machine 102A are worddoc1.doc 138 and presentation1.ppt 124. Presentation1.ppt 124 is stored on the file hosting server 106. However, the MRU-client list 112B shows that user A's most recently used documents on client machine 102B include presentation1.ppt 124 and worddoc2.doc 128, both of which are stored on file hosting server 106. The MRU-server document list 132A for user A shows that both presentation1.ppt 124 and worddoc2.doc 128 were more recently used by user A. The MRU-client document list 112A appears to be out of sync with the more recent accesses of user A's documents stored on the file hosting server 106.

Figure 2:
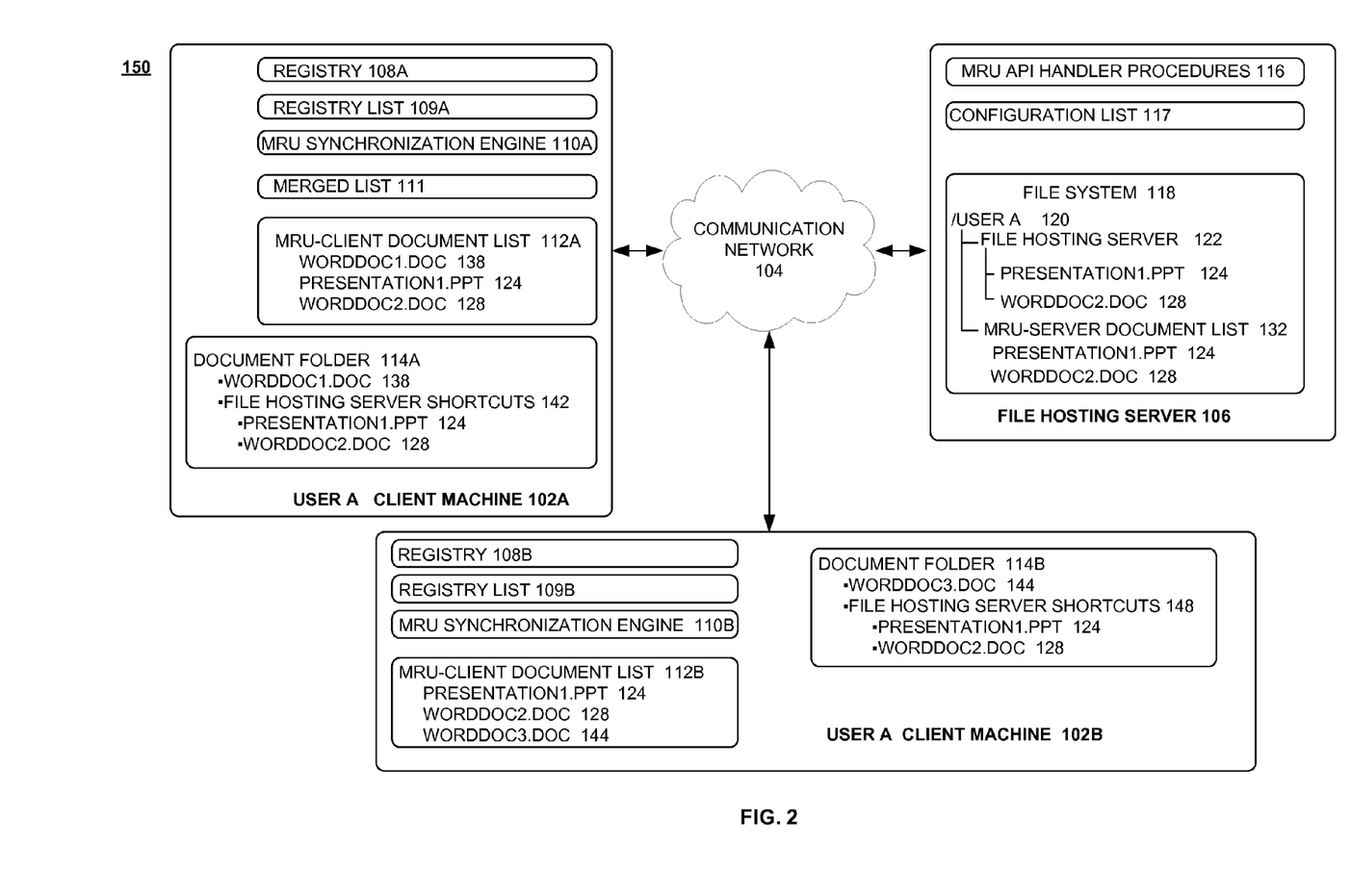
FIG. 2 illustrates another exemplary system for automatically synchronizing a MRU-client document list with a MRU-server document list.

Referring to FIG. 2, there is shown the system of FIG. 1 where user A's MRU-client document list 112A on client machine 102A is synchronized with respect to user A's documents stored on the file hosting server 106 which were more recently used on client machine 102B. Client machine 102A utilizes the MRU synchronization engine 110A to synchronize the MRU-client document list 112A with the MRU-server document list 132. Client machine 102A contains a merged list 111A that is a temporary file used to merge entries from the registry list 109 and the configuration list 117 in order to generate an updated MRU-client document list 112A. As shown in FIG. 2, the MRU-client document list 112A now includes worddoc2.doc 128 and all of user A's MRU-client document lists 112A, 112B are in sync with respect to user A's most recently used documents that are stored on the file hosting server 106.

It should be noted that other situations may occur resulting in the MRU-server document list not reflecting the user's most current usage. For example, if a document was deleted off the MRU-server document list 132 and later reopened on a client machine 102, then the document is eligible for consideration on the MRU-server document list 132. Furthermore, if a document's pin state was altered on the client machine 102, this may affect the document's placement on the MRU-server document list 132.

Attention now turns to a more detailed discussion of operations for the embodiments with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
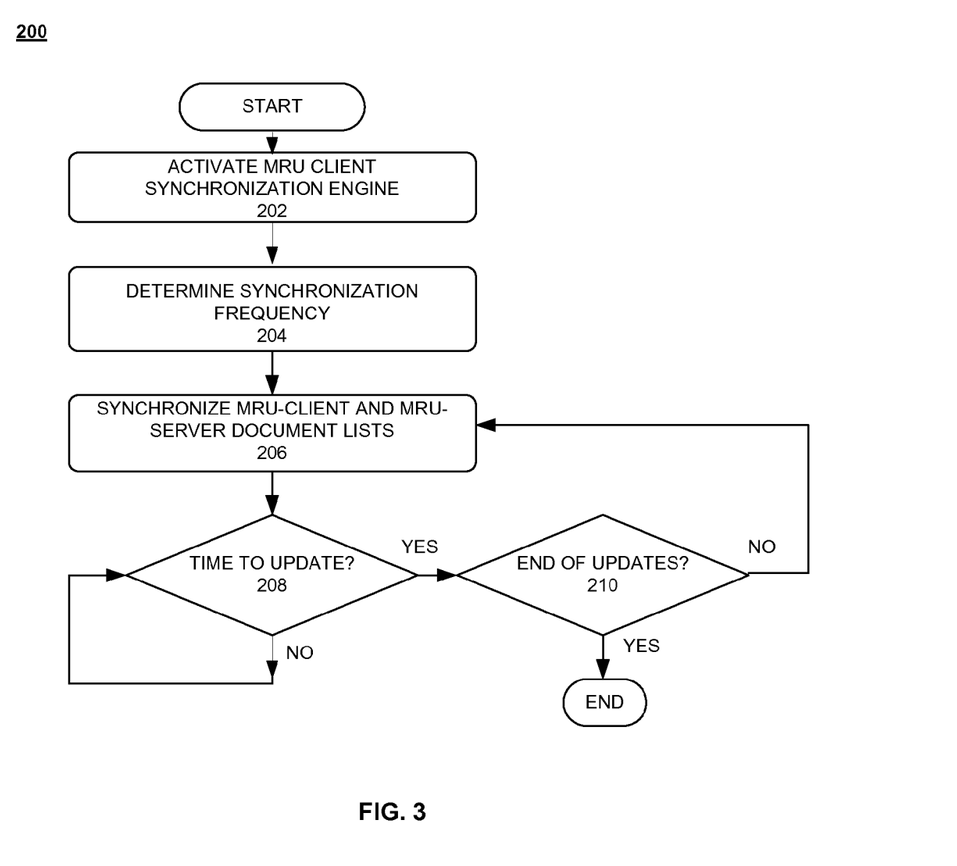
FIG. 3 is a flow chart illustrating an exemplary method for automatically synchronizing MRU document lists.

FIG. 3 illustrates a flow chart of an exemplary method for automatically synchronizing MRU document lists. It should be noted that the method 200 may be representative of some or all of the operations executed by one or more embodiments described herein and that the method can include more or less operations than that which is described in FIG. 3. In an embodiment, the method may illustrate operations for the MRU synchronization engine 110.

In several embodiments, the MRU synchronization engine 110 may be activated automatically when the user initially logs into a user account from a client machine 102 (block 202). In alternate embodiments, the MRU synchronization engine 110 may be activated by the user directly (block 202). Upon activation, the MRU synchronization engine 110 initiates the synchronization operations once the user is logged into a user account on the file hosting server 106 (block 202).

The MRU synchronization engine 110 determines the frequency at which the synchronization operations may be performed (block 204). In an embodiment, the synchronization operations may be performed in accordance with a polling frequency. The polling frequency may be a default value, a user configuration input, or a combination thereof and may be used to determine the time interval at which the synchronization operations are performed after the initial synchronization.

The MRU synchronization engine 110 may initially perform the synchronization operations upon activation of the MRU synchronization engine 110 (block 206). Thereafter, additional synchronizations are performed in accordance with the polling frequency. At the time indicated to perform an update (block 208—yes) when additional updates are to be performed (block 210—no), the MRU synchronization engine 110 may synchronize the MRU client and MRU server document lists (block 206). Otherwise when it is not time to perform an update (block 208—no), the method polls until the next time update occurs. The synchronization updates are terminated when the user logs off the client machine 102 or when the polling frequency has been satisfied (block 210—yes).

In another embodiment, the MRU synchronization engine 110 may receive notifications from the file hosting server 106 when the MRU-server document list 132 has been updated. The MRU synchronization engine 110 may perform the synchronization operations upon receipt of the configuration list 117 instead of performing them in accordance with the polling frequency. In another embodiment, the MRU synchronization engine 110 may receive notifications from the file hosting server 106 when a new entry is placed onto the MRU-server document list 132. The file hosting server 106 may forward the new entry to the MRU synchronization engine 110 which may then update the MRU-client document list 112 upon receipt. Attention now turns to a discussion of the method of performing the synchronization of the client and server MRU documents lists.

Figure 4:
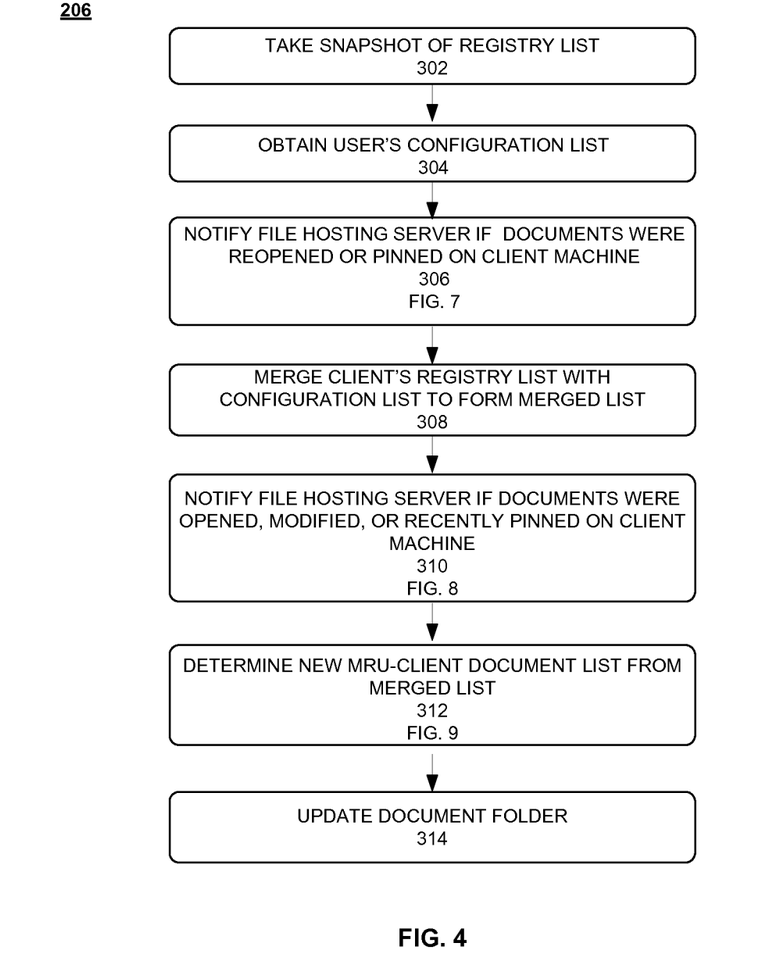
FIG. 4 is a flow chart illustrating an exemplary method for performing operations that synchronize MRU document lists.
Figure 5:
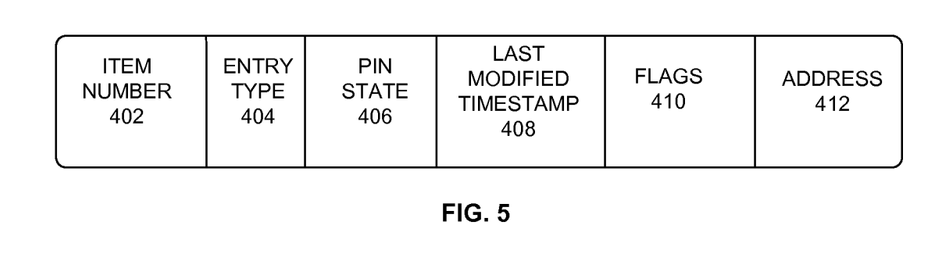
FIG. 5 is an exemplary layout of an entry in a registry list.

Referring to FIG. 4, there is shown a flow chart illustrating a method 206 for synchronizing the MRU document lists. A snapshot or copy of the document entries in the registry 108 may be made and stored in a registry list 109 (block 302). The document entries stored in the registry 109 may have a format containing the data fields shown in FIG. 5. Turning to FIG. 5, a document entry in the registry 109 may contain an item number 402, an entry type 404, a pin state 406, a last modified timestamp 408, a flags field 410, and an address field 412. The item number 402 is a reference indicating a placement of the entry in the registry key. The entry type indicates the type of entry. For example, the text string "REG_SZ" indicates the document is an Office document and not metadata. The pin state 406 indicates whether or not the document is to stay on the MRU document list. When a document is "pinned", the document remains on the MRU document list regardless of whether it has been recently used. The last modified timestamp 408 indicates the last time the file was used and the flags 410 are for the use of an operating system. The address 412 is a location for the document and it may be a URL, a physical address, a network address, or a DAV address.

Turning back to FIG. 4, the MRU synchronization engine 110 requests from the file hosting server 106 the configuration list 117 (block 304). In one or more embodiments, the request may be made through an API. Alternatively, messages may be transmitted between the client machine 102 and the file hosting server 106. The user's configuration list 117 may structured in the form of an XML (extensible markup language) file or a JSON (JavaScript Object Notation) file.

Figure 6:
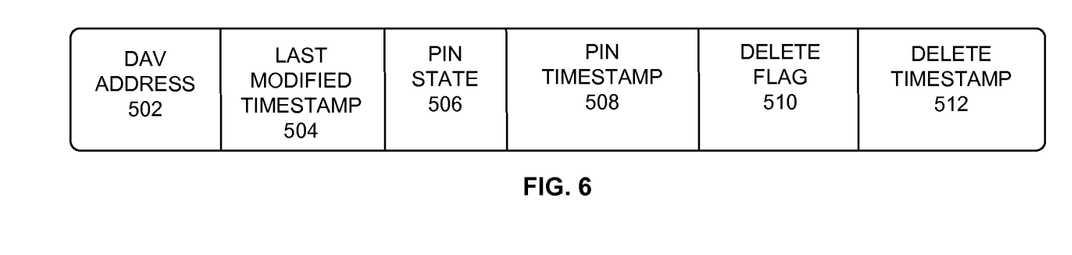
FIG. 6 is an exemplary layout of an entry in a configuration list.

The data format of an exemplary document entry in a configuration list 117 may be configured as shown in FIG. 6. Referring to FIG. 6, there is shown an entry in the configuration list 117 containing a DAV address 502, a last modified timestamp 504, a pin state 506, a pin timestamp 508, a delete flag 510, and a delete timestamp 512. A DAV address 502 is the same address used by the MRU-client document lists and is a unique identifier on the file hosting server. The last modified timestamp 504 indicates the last time the file was opened or saved. The pin state 506 indicates whether or not the document is to stay on the MRU document list. The pin timestamp 508 indicates the time at which the document was pinned. The delete flag 510 indicates whether or not the document was deleted from the MRU-server document list and the delete timestamp 512 indicates the time of the deletion.

Turning back to FIG. 4, a configuration list 117 may not have been updated to reflect recent uses or changes made to a document while the user was operating on a client machine 102. The MRU synchronization engine 110 may discover these changes and notify the file hosting server 106 so that the MRU-server document list 132 is updated accordingly (block 306). In particular, the MRU synchronization engine 110 may discover documents that were deleted from the MRU server document list 132 yet were subsequently reopened or resaved on a client machine 102. The MRU synchronization engine 110 may also detect documents that were unpinned and subsequently repinned by the user while operating on a client machine 102. In both cases, these documents may be placed back on the MRU-server document list 132.

Figure 7:
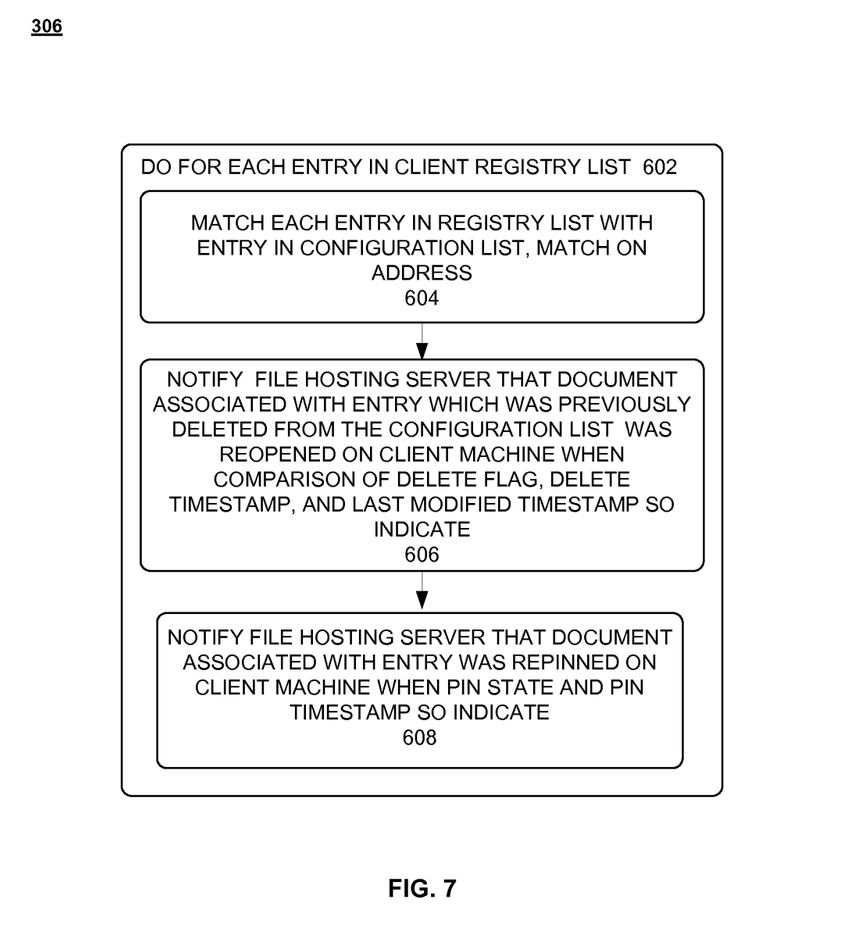
FIG. 7 is a flow chart illustrating an exemplary method for analyzing entries in the registry list and the configuration list.

Turning to FIG. 7, the MRU synchronization engine 110 reads each entry in the client registry list (block 602) and matches the address field 412 of the entry from the registry list with the DAV address 502 in the configuration list 117 (block 604). The delete flag 510 in the configuration list 117 is raised when a user deletes the document from the MRU-server document list 132 and the delete timestamp 512 indicates the time when the deletion occurred. The last modified timestamp 408 in the corresponding entry in the registry list indicates the last time when the document was used. When the delete flag 510 is raised and the last modified timestamp 408 in the registry entry is later than the delete timestamp 512, then the document was reopened on the client machine 102 after the document was deleted from the MRU-server document list 132 (block 606). In this case, the MRU synchronization engine 110 notifies the file hosting server 106 of this condition through an API procedure call (block 606).

Next, the MRU synchronization engine 110 determines if a document that was previously unpinned has been pinned by a user while operating on a client machine 102. To detect this condition, the MRU synchronization engine 110 compares the pin state 406 of the document entry in the registry list with the corresponding entry in the configuration list 117 (block 608). When the pin state 506 from the configuration list 117 indicates that the document is not pinned and the pin timestamp 508 from the configuration list 117 is earlier than the last modified timestamp 408 of the corresponding entry in the registry list, then the MRU synchronization engine 110 notifies the file hosting server 106, through an API procedure call, that the document entry has been pinned (block 608).

Referring back to FIG. 4, the MRU synchronization engine 110 merges the registry list 109 and the configuration list 117 into a merged list 111 containing all the entries from the registry list that pertain to the documents at issue and all the entries from the configuration list 117 (block 308). The merged list 111 may then be analyzed for documents that have been more recently opened, modified, saved, or pinned on the client machine 102 (block 310).

Figure 8:
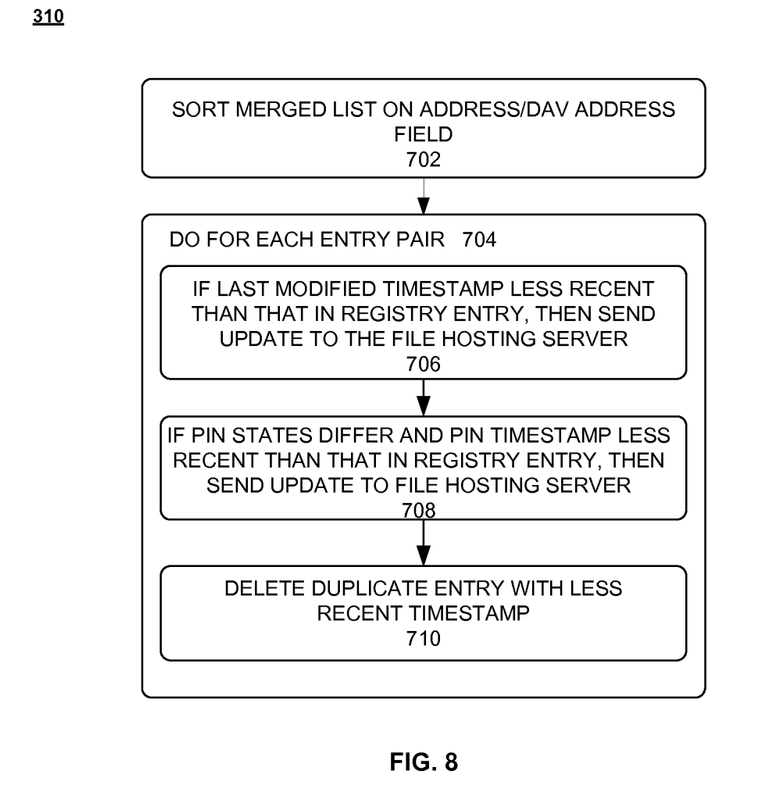
FIG. 8 is a flow chart illustrating an exemplary method for analyzing a merged list.

Referring to FIG. 8, the MRU synchronization engine 110 proceeds by sorting the merged list 111 by address. In particular, the address field 412 of the registry list and the DAV address 502 of the MRU server document list 132 may be used as the sort criteria (block 702). When the merged list entries are sorted by address, entries having a common address are positioned one after the other. As such, it is easier to match a document entry in the registry list with its corresponding entry in the configuration list 117.

The MRU synchronization engine 110 compares a document's entry in the registry list with the corresponding entry in the configuration list 117 (i.e., entry pair) (block 704). For each such entry pair (block 704), the MRU synchronization engine 110 analyzes the entry pair for more recent uses made to the document while the user was operating on a client machine 102 which are not reflected in the configuration list 117.

The MRU synchronization engine 110 compares the last modified timestamp 408 of the registry list entry with the last modified timestamp 504 (block 706). If the last modified timestamp 408 on the registry entry is less recent, then the document has been accessed on a client machine 102 later than the last use of the document on the file hosting server 132. In this case, the MRU synchronization engine 110 notifies the file hosting server 106 of this event through an API procedure call (block 706).

In addition, the MRU synchronization engine 110 compares the pin state and pin timestamp for a document entry in both the registry list 109 and the configuration list 117 in order to determine if the document's pin state was modified by the user operating on a client machine 102 (block 708). If the pin state 406 and the pin timestamp 408 on the document's entry in the registry list is less recent than the pin timestamp 508 on the corresponding entry in the configuration list 117, then the document's pin state was modified by the user while operating on the client machine 102. The MRU synchronization engine 110 notifies the file hosting server 106 of this situation through an API procedure call (block 708). Lastly, for each entry pair, the entry with the less recent last modified timestamp is deleted (block 710).

Figure 9:
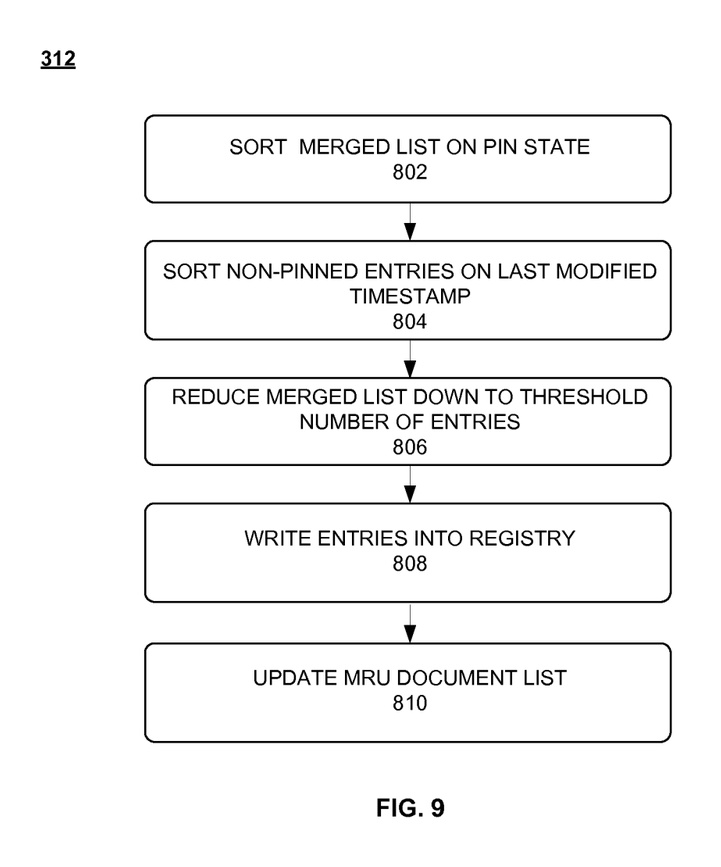
FIG. 9 is a flow chart illustrating an exemplary method for creating an updated MRU-client document list.

Turning back to FIG. 4, a new MRU client document list is then created from the merged list 111 (block 312). Referring to FIG. 9, the merged list 111 is sorted on pin state in order to get the pinned documents to the top of the merged list 111 (block 802). Next, the unpinned documents are sorted by last modified timestamp in order to place the unpinned documents with the latest timestamp ahead of those with an earlier timestamp (block 804). Thereafter, the merged list 111 may be trimmed to only include the maximum number of entries allowed in a MRU-client document list (block 806). The more recently used documents are at the top of the list while the earlier-used documents are at the end of the merged list 111. If the number of entries in the merged list 111 exceeds the maximum number of entries allowed in a MRU-client document list, then the merged list 111 only takes the maximum number from the top of the merged list 111 (block 806).

The merged list 111 at this point is the updated MRU client document list. Each entry in the updated MRU client document list may be written into the registry 108 (block 808) and the new MRU client document list replaces the existing MRU client document list (block 810). Turning back to FIG. 4, the MRU synchronization engine 110 replaces the document folder for the file hosting server documents with the addresses or shortcuts contained in the updated MRU client document list (block 314). Attention now turns to a discussion of the operating environment.

Figure 10:
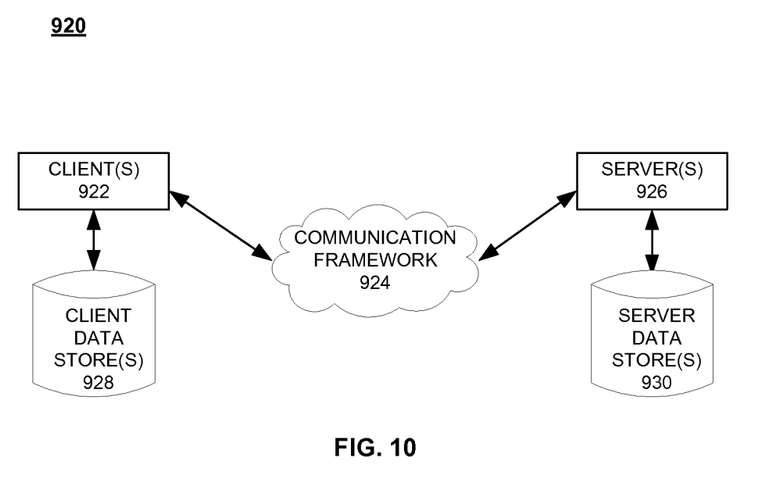
FIG. 10 is a block diagram illustrating an exemplary operating environment.

Referring now to FIG. 10, there is shown a schematic block diagram of an exemplary operating environment 920. The operating environment 920 may include one or more client(s) 922 in communication through a communications framework 924 with one or more server(s) 926. In an embodiment, a client 922 may be configured to use documents or data stored in a server 926 and the client 922 may be implemented as the client machine 102. In an embodiment, the server 926 may receive requests from one or more clients 922 to access the documents and data stored therein. In an embodiment, the server 926 may be implemented as the file hosting server 106.

A client 922 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 922 may also be embodied as a software module having instructions that execute in a single execution path, multiple concurrent execution paths (e.g., thread, process, etc.), or in any other manner.

A server 926 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 926 may also be embodied as a software module having instructions that execute in a single execution path, multiple concurrent execution paths (e.g., thread, process, etc.), or in any other manner.

The communications framework 924 facilitates communications between the client 922 and the server 926. The communications framework 924 may embody any type of communications medium, such as wired or wireless networks, utilizing any communication protocol.

Figure 11:
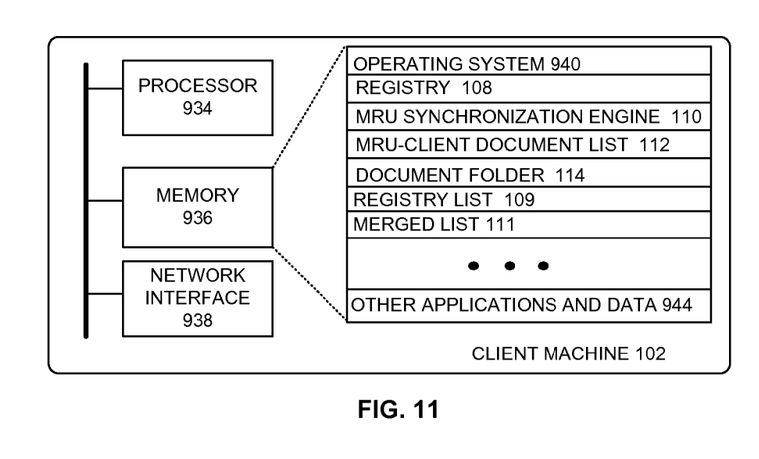
FIG. 11 is a block diagram illustrating an exemplary client machine.

Referring to FIG. 11, a client machine 102 may have a processor 934, a memory 936, and a network interface 938. The processor 934 may be any commercially available processor and may include dual microprocessors and multi-processor architectures. The network interface 938 facilitates wired or wireless communications between the client machine 102 and a communications network 104 in order to provide a communications path between the client machine 102 and the file hosting server 106.

The memory 936 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 936 may also include one or more external storage devices or remotely located storage devices. The memory 936 may contain instructions and data as follows:

- an operating system 940;
- a registry 108;
- a MRU synchronization engine 110;
- a MRU-client document list 112;
- a document folder 114;
- a registry list 109;
- a merged list 111; and
- various other applications and data 944.

Figure 12:
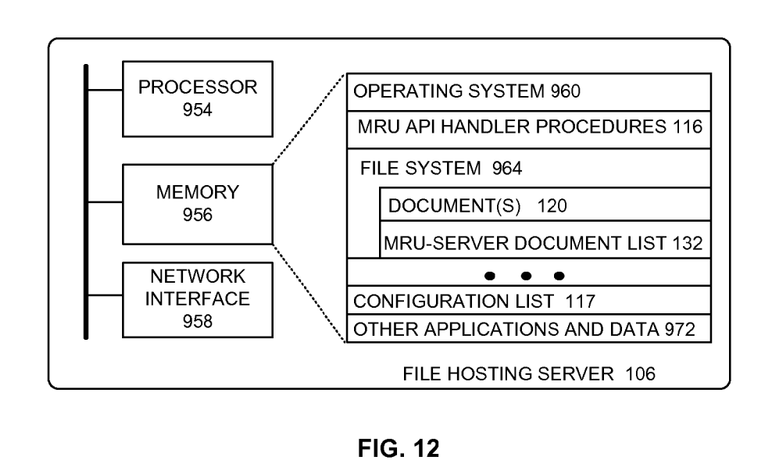
FIG. 12 is a block diagram illustrating an exemplary file hosting server.

Referring to FIG. 12, a file hosting server 106 may have a processor 954, a memory 956, and a network interface 958. The processor 954 may be any commercially available processor and may include dual microprocessors and multi-processor architectures. The network interface 958 facilitates wired or wireless communications between the file hosting server 106 and a communications network 104 in order to provide a communications path between a client machine 102 and the file hosting server 106.

The memory 956 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 956 may also include one or more external storage devices or remotely located storage devices. The memory 956 may contain instructions and data as follows:

- an operating system 960;
- MRU API handler procedures 116;
- a file system 964 containing documents 120 and a MRU-server document list 132;
- configuration list 117; and
- other applications and data 972.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

What is claimed:

1. A system comprising:
   at least one processor;
   at least one memory connected to the at least one processor; and
   at least one module that when loaded into the memory causes the at least one processor to:
   obtain a registry list including configuration data pertaining to a plurality of user documents accessed by a user from a client machine;
   send a request for a configuration list stored on a remote file hosting server, the configuration list including configuration data pertaining to the user's most recently used (MRU) server documents;

in response to sending the request for the configuration list, receive, at the client machine, the configuration list;

combine the registry list with the configuration list into a merged list;

sort the merged list by an address field of the registry list and an address of the configuration list, wherein the address of the configuration list is a unique identifier on the file hosting server, to create a document entry pair including a document entry from the registry list and a corresponding document entry from the configuration list;

for each document entry pair in the sorted merged list, compare a pin state and a pin timestamp of the document entry from the registry list with a pin state and a pin timestamp of the document entry from the configuration list to determine if the pin state of the document entry from the registry list has been modified by the user from the client machine;

when it is determined that the pin state of the document entry from the registry list has been modified by the user from the client machine, send a pin state modification notification to the remote file hosting server; and form a MRU-client document list from the sorted merged list, the MRU-client document list comprising a folder of links to the user's most recently used documents.

2. The system of claim 1, further comprises:
a module that when loaded into the memory causes the at least one processor to:
prior to updating the MRU-client document list, sort non-pinned entries in the sorted merged list on a last modified timestamp.

3. The system of claim 2, wherein the module causes the at least one processor to:
reduce the sorted merged list to a threshold number of entries.

4. The system of claim 1, further comprising:
a module that when loaded into the memory causes the at least one processor to:
notify the remote file hosting server of updates made from the client machine to a user document listed in the configuration list.

5. The system of claim 1, wherein the at least one module causes the at least one processor to combine the registry list with the configuration into a merged list, further causes the at least one processor to:
match an entry in the registry list with a corresponding entry in the configuration list;
identify that the entry was deleted from the configuration list and reopened on the client machine; and
notify the file hosting server of the user document associated with the entry.

6. The system of claim 1, wherein the at least one module causes the at least one processor to combine the registry list with the configuration into a merged list, further causes the at least one processor to:
match an entry in the registry list with a corresponding entry in the configuration list;
determine that the entry was repinned on the client machine; and
notify the file hosting server of the user document associated with the entry.

7. The system of claim 1, wherein the at least one module causes the at least one processor to combine the registry list with the configuration into a merged list, further causes the at least one processor to:
match an entry in the registry list with a corresponding entry in the configuration list;
determine that the entry was modified on the client machine; and
notify the file hosting server of the user document associated with the entry.

8. The system of claim 1, further comprises:
a module that when loaded into the memory causes the at least one processor to:
update the MRU-client document list at predetermined time intervals.

9. The system of claim 1, further comprises:
a module that when loaded into the memory causes the at least one processor to:
update the MRU-client document list upon receipt of the configuration list from the remote file hosting server.

10. The system of claim 1, wherein the at least one module causes the at least one processor to combine the registry list with the configuration into a merged list, further causes the at least one processor to:
match an entry in the registry list with a corresponding entry in the configuration list;
determine that the entry is in the registry list has a more recent timestamp; and
notify the file hosting server of the entry having a more recent timestamp.

11. The system of claim 1, wherein the at least one module causes the at least one processor to combine the registry list with the configuration into a merged list, further causes the at least one processor to:
match an entry in the registry list with a corresponding entry in the configuration list;
determine that the entry in the registry list has a pin state that differs from the corresponding entry in the configuration list and a more recent pin timestamp than the corresponding entry in the configuration list; and
notify the file hosting server of the more recent timestamp and pin state of the entry.

12. A method, comprising:
obtaining a registry list including configuration data pertaining to a plurality of user documents accessed by a user from a client machine;
sending a request for a configuration list stored on a remote file hosting server, the configuration list including configuration data pertaining to the user's most recently used (MRU) server documents;
in response to sending the request for the configuration list, receive, at the client machine, the configuration list;
combining the registry list with the configuration list into a merged list;
sorting the merged list by an address field of the registry list and an address of the configuration list, wherein the address of the configuration list is a unique identifier on the file hosting server, to create a document entry pair including a document entry from the registry list and a corresponding document entry from the configuration list;
for each document entry pair in the sorted merged list, comparing a pin state and a pin timestamp of the document entry from the registry list with a pin state and a pin timestamp of the document entry from the configuration list to determine if the pin state of
the document entry from the registry list has been modified by the user from the client machine;

when it is determined that the pin state of the document entry from the registry list has been modified by the user from the client machine, sending a pin state modification notification to the remote file hosting server; and forming a most recently used (MRU)-client document list from the sorted merged list, the MRU-client document list including a folder of links to the user's most recently used documents, wherein the folder is part of a file system structure.

13. The method of claim 12, wherein a first group of entries include a pin state and a second group of entries do not include a pin state.

14. The method of claim 12, wherein combining the registry list with the configuration into a merged list further comprises:

matching a user document in the registry list to a corresponding entry in the configuration list; and notifying the remote file hosting server of updates made to a user document in the registry list that differs from the configuration list.

15. The method of claim 12, prior to combining the registry list with the configuration list into a merged list, notifying the remote file hosting server of a user document pinned or reopened on the client machine.

16. The method of claim 12, after combining the registry list with the configuration list into a merged list, the method further comprises:

matching a user document in the registry list to a corresponding entry in the configuration list;

identifying from the registry list and the configuration list that the user document has been opened, modified, or recently pinned on the client machine; and notifying the remote file hosting server.

17. A system, comprising:
at least one processor;
a memory comprising:
a first list of user documents accessed by a user;
a second list of user documents representing the user's most recently used (MRU) user documents stored on a remote file hosting server;

a MRU synchronization engine, including processor-executable instructions that when executed on the at least one processor, generates a MRU list of user documents from a client machine and the remote file hosting server by:

generating a merged list of user documents from the first list and the second list;

sorting the merged list by an address field of the first list and an address of the second list, wherein the address of the second list is a unique identifier on the file hosting server, to create a document entry pair including a document entry from the first list and a corresponding document entry from the second list;

for each document entry pair in the sorted merged list, comparing a pin state and a pin timestamp of the document entry from the first list with a pin state and a pin timestamp of the document entry from the second list to determine if the pin state of the document entry from the first list has been modified by the user from the client machine;

when it is determined that the pin state of the document entry from the first list has been modified by the user from the client machine, sending a pin state modification notification to the remote file hosting server; and generating the MRU list of user documents from the sorted merged list.

18. The system of claim 17, wherein the MRU synchronization engine notifies the remote file hosting server of a user document in the first list that was more recently accessed or repinned and not contained in the second list.

19. The system of claim 17, wherein the MRU synchronization engine notifies the remote file hosting server of a user document in the merged list that was more recently accessed, modified or pinned.

20. The system of claim 17, wherein sorting the merged list by an address field of the first list and the address of the second list further comprising sorting unpinned user documents by a last modified timestamp.

* * * * *